(12) United States Patent
Graen

(10) Patent No.: US 6,515,600 B2
(45) Date of Patent: Feb. 4, 2003

(54) CIRCUIT ARRANGEMENT FOR REGENERATING THE BLACK LEVEL OF VIDEO SIGNALS

(75) Inventor: Thomas Graen, Darmstadt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/940,043

(22) Filed: Aug. 27, 2001

(65) Prior Publication Data

US 2002/0033764 A1 Mar. 21, 2002

(30) Foreign Application Priority Data

Aug. 29, 2000 (DE) .......................................... 100 42 281

(51) Int. Cl.$^7$ ................................................ H03M 1/06
(52) U.S. Cl. ........................ 341/118; 341/115; 341/131; 341/155
(58) Field of Search ................................. 341/118, 155, 341/115, 131

(56) References Cited

U.S. PATENT DOCUMENTS

| | | | |
|---|---|---|---|
| 5,084,700 A | | 1/1992 | Christopher ................ 341/118 |
| 5,087,973 A | * | 2/1992 | Kawahara . .................. 348/572 |
| 5,451,947 A | * | 9/1995 | Morrison ..................... 341/131 |
| 5,552,783 A | * | 9/1996 | Kommrusch ................ 341/118 |
| 5,874,909 A | * | 2/1999 | Soenen et al. .............. 341/141 |
| 5,886,659 A | * | 3/1999 | Pain et al. ................... 341/155 |
| 6,271,785 B1 | * | 8/2001 | Martin et al. ............... 341/169 |

* cited by examiner

Primary Examiner—Michael Tokar
Assistant Examiner—Linh Van Nguyen
(74) Attorney, Agent, or Firm—Edward W. Goodman

(57) ABSTRACT

In a circuit arrangement for regenerating the black level of video signals during A/D conversion, in which a deviation of the black level of the digital video signals from a predetermined value influences the black level of the analog video signals, the scanning values obtained during the A/D conversion of the black level of the analog video signals are compared with the predetermined value. A ramp signal for tendency-compensating the deviations is superimposed on the analog video signals.

6 Claims, 1 Drawing Sheet

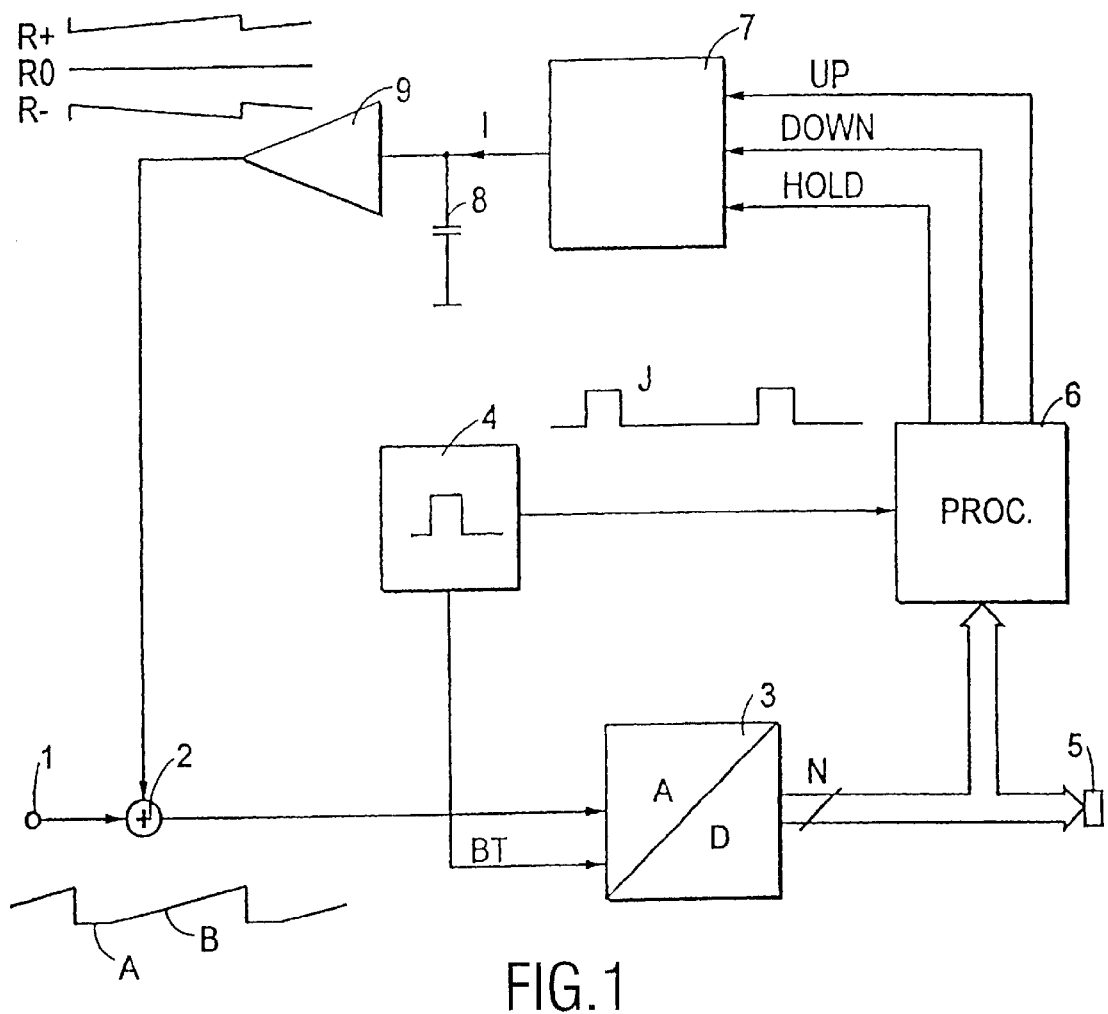

CIRCUIT ARRANGEMENT FOR REGENERATING THE BLACK LEVEL OF VIDEO SIGNALS

BACKGROUND OF THE INVENTION

1. Field of the Invention

The invention relates to a circuit arrangement for regenerating the black level of video signals during their A/D conversion, in which a deviation of the black level of the digital video signals from a predetermined value influences the black level of the analog video signals.

2. Description of the Related Art

Video signals generally comprise a black reference level, hereinafter also referred to as black level, per line within the blanking interval. The black level is already generated in image pick-up devices, such as, for example, CCD frame sensors, and mainly serves as a reference value after transmission of the video signals. To recover the DC value lost during transmission, known clamping and black level control circuits are used.

If an analog video signal is to be subjected to an A/D conversion, referencing to the black level is also necessary in order that a predetermined value in the generated digital video signals corresponds to the black level as accurately as possible. For this purpose, circuits are known from, for example, U.S. Pat. No. 5,084,700 or U.S. Pat. No. 5,087,973, which, in the digital plane, perform a nominal-real value comparison for the position of the black level and derive analog adjusting values therefrom. The black level of the analog video signal is shifted by adding the correction signal. The correction value computed in the digital plane always influences the entire subsequent line. It is, therefore, possible that the black level jumps in amplitude from line to line. This may lead to unwanted line-frequent noise effects.

SUMMARY OF THE INVENTION

It is therefore an object of the present invention to provide a circuit arrangement for regenerating the black level in which these unwanted noise effects do not occur.

In the circuit arrangement according to the invention, this object is achieved in that the scanning values obtained during A/D conversion of the black level of the analog video signals are compared with the predetermined value, and in that a ramp (or sawtooth) signal for tendency-compensating the deviations is superimposed on the analog video signals. Particularly, the comparison is performed during the blanking intervals, and the ramp signal extends through the subsequent line.

To prevent disturbances due to addition of the ramp signal, also in critical image contents, for example, in areas of a single color, the circuit arrangement according to the invention may be characterized in that the amplitude of the ramp signal is smaller than a quantization step in the A/D conversion.

A further embodiment of the circuit arrangement according to the invention is characterized in that the differential values, obtained in the comparison of the scanning values with the predetermined value, are added with the correct sign during a blanking interval, and in that the result of the addition is used to generate the ramp signal in such a way that the ramp signal is zero at a result within the predetermined limits, positive at a result below the predetermined limits, and negative at a result above the predetermined limits.

Due to these measures, a suppression of the noise superimposed on the black level is simply possible when using the ramp signal. This further embodiment may be realized without extensive computations when the differential values are limited to the states >, < and = and when the addition is effected by way of up/down counting.

An advantageous embodiment of the invention is characterized in that a capacitor and a current source are provided for generating the ramp signal, this current source being controllable for supplying a positive current, a negative current, or no current.

These and other aspects of the invention are apparent from and will be elucidated with reference to the embodiments described hereinafter.

BRIEF DESCRIPTION OF THE DRAWING

In the drawing:

FIG. 1 is a block diagram of a circuit arrangement according to the invention; and FIG. 2 shows, diagrammatically, the generation of a control signal for a ramp signal generator.

DESCRIPTION OF THE PREFERRED EMBODIMENTS

The analog video signal is applied from an input 1 via an adder 2 to an input of an A/D converter 3. During each line, the analog video signal comprises a blanking interval A and an image part B which, as usual, is diagrammatically shown as a sawtooth signal extending from black to white.

The A/D converter receives a bit clock BT from a pulse generator 4 and generates digital video signals with a bit length of N, for example, 8, 10 or 12 bits. These video signals are applied to an output 5 and to an input of a processor 6. The processor 6 receives a signal J from the pulse generator 4, this signal J being active during the blanking interval A and thus allows the processor 6 to evaluate the digital video signal only during the blanking interval.

To generate a ramp signal R to be added to the analog video signal, a controllable current source 7, a capacitor 8 and a separating amplifier (buffer) 9 are used. The processor 6 controls the controllable current source 7 in such a way that the ramp signal R either rises (UP), falls (DOWN) or is set to zero.(HOLD). The corresponding ramp signals are denoted by R+, R– and R0 in FIG. 1. As compared with the known circuit arrangements, the DC level of the analog video signals applied to the A/D converter is not changed in jumps from line to line, but rather, changes gradually due to the ramp signal. However, since also the DC level of the. applied analog video signals changes gradually, a flawless correction can be performed. The amplitude of the ramp signal is then smaller than a quantization step so that, due to the ramp signal R, at most a change of the digital signals by the value of the least significant bit (LSB) within the active line is the result, which,.at the predetermined, sufficient bit length, does not result in visible disturbances in the displayed video signal.

The processor 6 may be realized in different ways with one or more integrated circuits, and essentially comprises a digital comparator and an up/down counter. The function of the processor 6 will hereinafter be elucidated with reference to FIG. 2, with examples of scanning values A1 to A8 occurring during the blanking interval being shown in the left-hand part. For the sake of clarity, the number of scanning values is limited to eight. An example of numbers for the differential value S is indicated in the lower line. The columns D1 and C1 are based on an embodiment using subtraction, whereas a comparison is used in the columns D2 and C2.

The column D1 shows the result of the subtraction between the scanning values A1 to A8 and the reference value S. The column C1 states the contents of an accumulator in which, starting from a count 0, the differential values are added with the correct sign. After the last scanning value A8, the result C1 (2 in the indicated example) is compared with two threshold values (−4 and +4 in the example shown). As long as the result is between these limits, the current I of the current source 7 (FIG. 1) is equal to 0, as in the example shown, i.e., the amplitude of the ramp signal is also 0. When the result C1 exceeds the lower limit, this means that the black level is too low in proportion to the reference value S so that the ramp signal must have a positive increase. Positive is herein understood to be in the direction of white. In the case of a positive result C1, the ratios are reversed.

The columns D2 and C2 relate to the above-mentioned processor with a comparator and an up/down counter. When the relevant scanning value A is larger than the reference value S, the counter is incremented, left in its original state in the case of the same scanning value, and decremented at a smaller scanning value. Due to the different evaluation of the differences, a different result C2 is achieved in this embodiment, this result C2 being, however, also within the limits of −4 and +4 in this example of numbers, so that the result is I=0.

What is claimed is:

1. A circuit arrangement for regenerating a black level of video signals during analog-to-digital (A/D) conversion, in which a deviation of the black level of the digital video signals from a predetermined value influences the black level of the analog video signals, characterized in that the circuit arrangement comprises:

an input for receiving analog video signals;

an A/D converter coupled to the input for digitally converting the analog video signals;

means for comparing scanning values obtained during A/D conversion of the black level of the analog video signals with the predetermined value thereby forming difference values, said comparing means performing the comparison during blanking intervals of the video signals;

means for generating a ramp signal for tendency-compensating deviations in response to the difference values, said ramp signal extending through a line containing the blanking interval and a subsequent line; and means for superimposing the ramp signal on the analog video signals prior to application to said A/D converter.

2. The circuit arrangement as claimed in claim 1, characterized in that the amplitude of the ramp signal is smaller than a quantization step used by said A/D converter.

3. A circuit arrangement as claimed in claim 1, characterized in that the circuit arrangement further comprises means for accumulating the differential values, formed by said comparing means comparing the scanning values with the predetermined value, with the correct sign during a blanking interval thereby forming a sum signal, said sum signal being applied to said generating means for generating the ramp signal such that the ramp signal is zero when the sum signal is within the predetermined limits, said ramp signal is positive when the sum signal is below the predetermined limits, and said ramp signal is negative when the sum signal is above the predetermined limits.

4. The circuit arrangement as claimed in claim 3, characterized in that the differential values are limited to the states >, < and =.

5. The circuit arrangement as claimed in claim 4, characterized in that accumulating means effects the accumulating of the differential values by up/down counting.

6. The circuit arrangement as claimed in claim 1, characterized in that said generating means comprises a capacitor and a current source, said current source being controllable by said comparing means for supplying a positive current, a negative current, or no current.

* * * * *